United States Patent

[11] 3,593,317

[72] Inventors Harold Fleisher Poughkeepsie; Arnold Weinberger, Newburgh; Vaughn D. Winkler, Poughkeepsie, all of, N.Y.

[21] Appl. No. 889,024
[22] Filed Dec. 30, 1969
[45] Patented July 13, 1971
[73] Assignee International Business Machines Corporation Armonk, N.Y.

[54] PARTITIONING LOGIC OPERATIONS IN A GENERALIZED MATRIX SYSTEM
4 Claims, 3 Drawing Figs.

[52] U.S. Cl. .......... 340/172.5
[51] Int. Cl. .......... G06c 15/00
[50] Field of Search .......... 340/166, 172.5, 347; 328/158; 235/157

[56] References Cited

UNITED STATES PATENTS

| | | | |
|---|---|---|---|
| 3,210,737 | 10/1965 | Perry et al. | 340/172.5 |
| 3,212,064 | 10/1965 | Krieger | 340/172.5 |
| 3,274,556 | 9/1966 | Paul et al. | 340/172.5 |
| 3,311,896 | 3/1967 | Delmege Jr. et al. | 340/172.5 |
| 3,371,320 | 2/1968 | Lachenmayer | 340/172.5 |
| 3,383,661 | 5/1968 | Goldstein | 340/172.5 |
| 3,400,379 | 9/1968 | Harman | 340/172.5 |

*Primary Examiner*—Paul J. Henon
*Assistant Examiner*—Sydney R. Chirlin
*Attorney*—Sughrue, Rothwell, Mion, Zinn and Macpeak

ABSTRACT: An improved method and means to implement a logic function F of N variables by partitioning the logic operation in a plurality of generalized logic matrices. It is first mathematically demonstrated that a function F of N variables may be expanded into subfunctions of a lesser number of variables. These subfunctions may be logically implemented individually and then logically combined so as to produce the desired function of N variables with a concomitant savings in logic circuitry over that required if the functions were directly implemented. The means used to implement the logic function F are a plurality of generalized logic matrices, each of which comprises a plurality of logic gates arranged in columns and rows, an input decoder for accepting the input variables, and a storage register for varying the functions generated at the output of the matrix. These matrices are arranged in cascade so that, as the function F is constructed from the several subfunctions, additional variables are inserted at each matrix stage until the function F of N variables is fully generated.

FIG. I

INVENTORS
HAROLD FLEISHER
ARNOLD WEINBERGER
VAUGHN D WINKLER

BY Sughrue, Rothwell, Mion, Zinn & Macpeak
ATTORNEYS

PARTITIONING LOGIC OPERATIONS IN A GENERALIZED MATRIX SYSTEM

BACKGROUND OF THE INVENTION

1. Field of the Invention

This invention relates to the implementation of logic functions of N variables and more particularly to a generalized matrix system for implementing a variety of logical functions with a minimum number of logic gates therein.

2. Description of the Prior Art

Logic matrices are known in the prior art. One such matrix is disclosed in U.S. Pat. No. 3,371,320, issued to R.R. Lachenmayer and entitled "Multipurpose Matrix." A generalized matrix allows for the generation of a variety of N variable logical functions while using the same configuration of logic gates and thus offers the advantage of tremendous versatility. It basically comprises a plurality of logic gates arranged in columns and rows, means to accept the N variables as inputs to the logic gates, and means to semipermanently store fixed inputs to the logic gates and thereby determining their output functions. A variety of logical functions as outputs is achieved by varying the stored input signals. A major disadvantage of these prior art generalized matrices is the large number of logic gates required to implement a desired function. Another disadvantage of some prior art generalized matrices is that a large function dependent number of logic levels is required to implement a desired function as in U.S. Pat. No. 3,400,379 issued to Harman. These disadvantages are particularly serious as the number of input variables increases because the resulting number of logic gates thus required increases and in some cases exponentially.

SUMMARY OF THE INVENTION

Accordingly, it is an object of this invention to provide a generalized matrix system which reduces the number of logic gates and logic levels necessary to produce an N variable function and maintains the number of logic level constant, independent of the function being generated.

In achieving this object a plurality of generalized matrices are employed. Each of these matrices comprises an input decoder, a plurality of logic gates arranged in columns and rows, and a storage register. The decoder accepts the input variables and provides an output indicative of the value of the input variables; there is one independent output signal for each combination of input variables. Thus, if there are two input variables there will be four possible outputs from the decoder indicating the following possible combinations of the input variables: $X_0X_1, \overline{X}_0X_1, X_0\overline{X}_1\overline{X}_0X_1$. There are the same number of rows in each matrix as there are possible outputs from the decoder. The number of columns depends upon the number of desired output functions since the outputs of each logical gate in each column are tied together to produce one desired output function for each column. The number of columns depends upon the number of desired output functions since the outputs of each logical gate in each column are tied together to produce one desired output function for each column. The storage register is variable and provides a second input to each of the logical gates. The values stored in the storage register determine the function produced in each column of the matrix since the output of each logical gate is dependent upon this input value.

If a function of N variables is desire, the N variables are the inputs to the matrix system. In accordance with the invention, a number U of the variables less than the total number N of these variables is independently decoded in a first generalized logic matrix. Similarly, a number V of these variables less than N is independently decoded in a first generalized logic matrix. Similarly, a number V of these variables less than N is independently decoded in a second generalized matrix. The column outputs from these two matrices are logically combined to yield functions of U+V variables. This technique may be repeated in a third and further generalized matrices until the function of N variables is generated. Thus, the invention provides for a generalized logic matrix system comprising a plurality of individual generalized matrices which are connected in parallel to generate the desired function of N variables. Since each individual matrix operates on less than the total number of variables, the logic operations performed by the matrix system are partitioned by the individual matrices.

DESCRIPTION OF THE PREFERRED EMBODIMENTS

Figure 1:
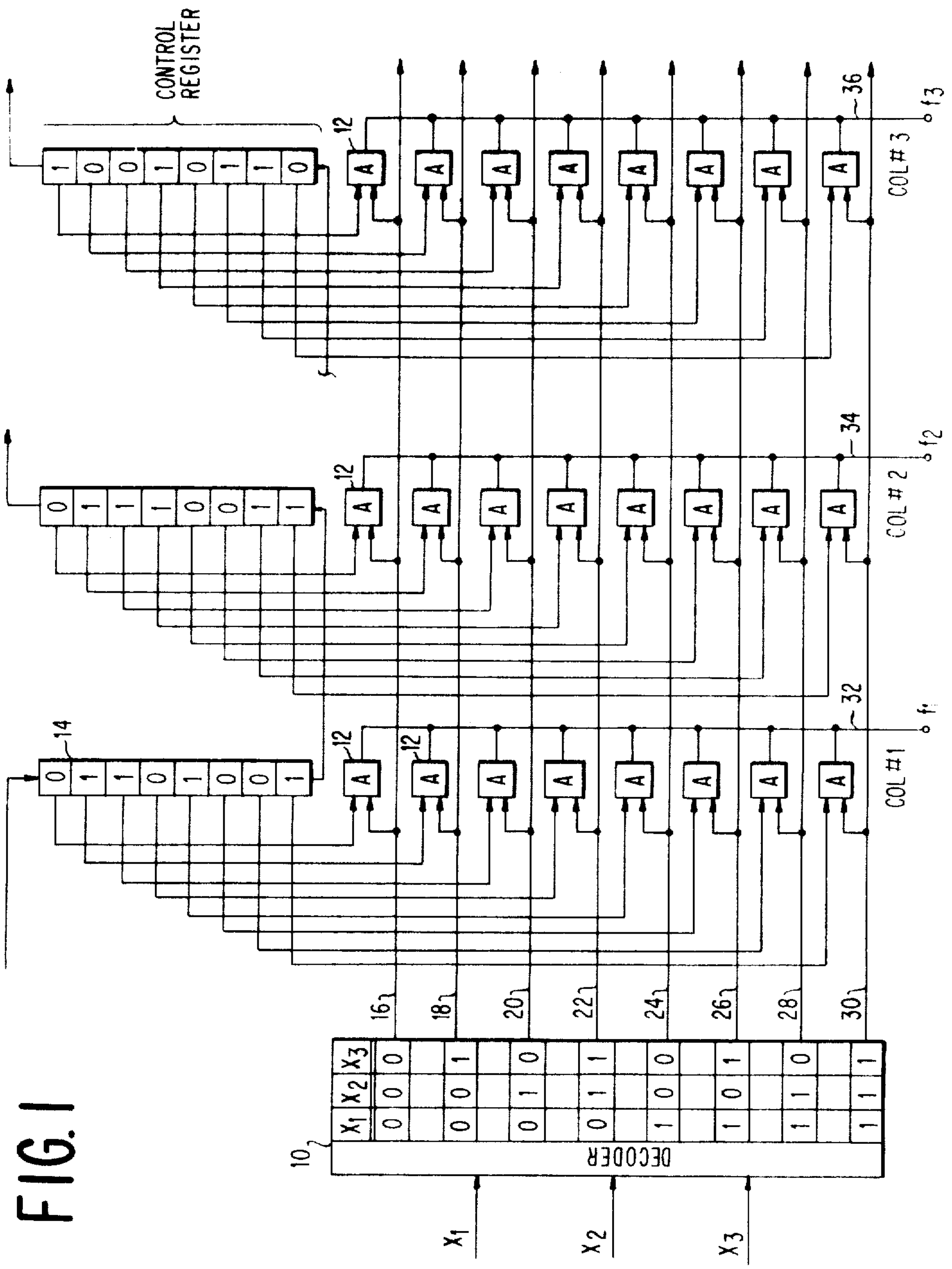
FIG. 1 illustrates a generalized logic matrix employed in the invention.

FIG. 1 illustrates a specific embodiment of a type of generalized logic matrix which may be employed in the subject invention. It consists basically of a decoder 10, a plurality of logic gates 12 arranged in columns and rows, and a storage register 14. The arrangement of the gates of the matrix into columns and rows is for descriptive purposes only as a special case of a dense topological grouping of logic gates. The logic gates 12 are illustrated as AND gates but the matrix may employ any conventional logic gate including OR, NAND or NOR gates. The decoder circuit 10 is conventional and its outputs provide inputs to the AND gates. It accepts the input variables $X_1$, $X_2$ and $X_3$ and produces an output signal on one of the lines 16—30 depending upon the combination of input variables. For example, if $X_1$ and $X_2$ are one's and $X_3$ is a zero the decoder provides an output only on line 28. This output is then used as an input to all the AND gates 12 associated with same row as line 28. The storage register is illustrated as a shift register 14 which has eight bit places for each column, each bit associated with one input of each AND gate. It is understood that other memory or storage embodiments may also be used in place of the shift register, e.g., a constant storage register such as a read only memory. The signals stored in each bit may be varied by conventional means. Each AND gate thus has two inputs, one from the output of the decoder and the other stored in an associated bit in the storage register. As illustrated, the outputs of the AND gates in each column are tied together by the lines 32, 34 and 36 respectively. There is thus one (column) output function for each column. It should be understood that the term "column" is derived from the particular illustrated row and column configuration of the generalized logic matrix. In another configuration, such as a concentric grouping of logic gates, the functional equivalent of the "column" may be achieved by the coupling of gates along selected radii of the concentric groups, or, alternatively, along selected annuli.

In another dense topological grouping of logic gates, the functional equivalent of a "column" may be a cross section through a three dimensional grouping, i.e., a planar configuration of logic gates now comprises the functional equivalent of a "column."

Thus, when the word "column" is used to designate a grouping of logic gates to achieve a logic function or subfunction as described herein, it will be understood in its most general sense.

Only three functions $f_1$, $f_2$ and $f_3$ of the three variables $X_1$, $X_2$ and $X_3$ are illustrated, one associated with each column; there are a possible 256 functions and this is illustrated by the dots between column 2 and column 3. The function generated at the output of each column is determined by the signals stored in the storage register. As illustrated, the functions generated are $F1=X_1 V X_2 V X_3$, $F2 = X_2 V(\overline{X}_1 \cdot X_3)$, $F3=\overline{F}1$. In operation, each cell of the storage register supplies an input to its corresponding AND gate according to the bit values stored in that cell. The other input to the AND gate is supplied by the corresponding decoder output line. Thus, for a given combination of input variables, one and only one of the output lines of the decoder has a positive output, and if the associated AND gate also has a positive signal from its corresponding storage bit, the output of the AND gate is positive to that combination of input variables. Since all of the AND gates of a column are interconnected, this positive signal appears as a column output.

Although FIG. 1 illustrates a matrix for $N=3$, it is clear that this approach may be employed for an arbitrary number of $N$ variables. However, the number of $N$ variable functions comprising this universe is $2^{2^N}$, of which only a relatively small number are useful functions in the sense of being utilized as design equations or state descriptions in an actual data processing system. Further, the number of output lines from the decoder is $2^N$, as is the number of logic gates per column and the number of bits in the storage register controlling each column. Thus, for $N=8$, a 256 output line decoder must be used to drive 256 logic gates per column, each column being controlled by 256 bits in its storage register. Hence, it is desirable to employ a plurality of matrices of fewer variables, and to partition the switching functions in such a way that a function of the required number of variables may be constructed, with no loss of generality, from functions of subsets of these variables.

Consider the function $F$ of $N$ variables: $f(X_0,X_1...X_{n11})$. This function may be expanded into its disjunctive normal form as follows:

$$f(X_0, X_1, \ldots, X_{n-1})=$$
$$K_0 \cdot \bar{X}_0 \cdot \bar{X}_1 \ldots \bar{X}_{n-1} V$$
$$K_1 \cdot X_0 \bar{X}_1 \ldots \bar{X}_{n-2} X_{n-1} X_{n-1} V \ldots V$$
$$K_{2n-1} \cdot X_0 X_1 \ldots X_{n-1}$$

where each $K_i$ is the coefficient of one of the AND combinations of $X_0$, $X_1$..., $X_{n11}$ and has a value of either zero or one. This disjunctive normal form for the function $F(X_0,X_1,...,X_{n11})$ may be grouped by factoring all terms in $X_{n11}$ and all terms in $X_{n11}$ as follows:

$$f(X_0, \ldots, X_{n-1}=[A_0 \bar{X}_0 \bar{X}_1 \ldots \bar{X}_{n-2}$$
$$v A_1 \bar{X}_0 \bar{X}_1 \ldots X_{n-2}$$
$$v A_{(2^{n-1}-1)} X_0 X_1 \ldots X_{n-2}] \bar{X}_{n-1}$$
$$+[B_0 \bar{X}_0 \bar{X}_1 \ldots \bar{X}_{n-2}$$
$$v B_1 \bar{X}_0 \bar{X}_1 \ldots X_{n-2}$$
$$v B_{(2^{n-1}-1)} X_0 X_1 \ldots X_{n-2}] X_{n-1}$$

The terms in the brackets are functions of the remaining $n-1$ variables ($X_0,X_1,...,X_{n12}$) expressed in disjunctive normal form. The $A$'s and the $B$'s are defined similarly to the $K$'s above.

Hence, it is evident that original equation may be written in the form:

$$F(X_0, X_1, \ldots, X_{n-1})=f_0(X_0, \ldots, \bar{X}_{n-2})X_{n-1}$$
$$V f_1(X_0, \ldots, X_{n-2})X_{n-1}$$

In addition, both $f_0$ and $f_1$ may be factored in a similar fashion, so that the function $F$ may be expanded even further. To illustrate this in detail, consider the case for a function $F$ of eight variables: $F(X_0,X_1,...,X_7)$. Expanding this function as described above:

← 8 var. → ← 7 var. →

$$F(X_0, \ldots, X_7)=f_0(X_0, \ldots, X_6) \quad \bar{X}_7$$
$$v f_1(X_0, \ldots, X_6) \quad \bar{X}_7$$

← 6 var. →

$$=g_0(X_0, \ldots, X_5) \quad \bar{X}_6 \bar{X}_7$$
$$v g_1(X_0, \ldots, X_5) \quad X_6 \bar{X}_7$$
$$v g_2(X_0, \ldots, X_5) \quad \bar{X}_6 X_7$$
$$v g_3(X_0, \ldots, X_5) \quad X_6 X_7$$

← 5 var. →

$$=h_0(X_0, \ldots, X_4) \quad \bar{X}_5 \bar{X}_6 \bar{X}_7$$
$$v h_1(X_0, \ldots, X_4) \quad X_5 \bar{X}_6 \bar{X}_7$$
$$v h_2)X_0, \ldots, X_4) \quad \bar{X}_5 X_6 \bar{X}_7$$
$$v h_3(X_0, \ldots, X_4) \quad X_5 X_6 \bar{X}_7$$

$$v h_4(X_0, \ldots, X_4) \quad \bar{X}_5 X_6 X_7$$
$$v h_5(X_0, \ldots, X_4) \quad X_5 \bar{X}_6 X_7$$
$$v h_6(X_0, \ldots, X_4) \quad \bar{X}_5 X_6 X_7$$
$$=j_0(X_0, \ldots, X_3) \quad \bar{X}_4 \bar{X}_5 \bar{X}_6 \bar{X}_7$$
$$v j_1(X_0, \ldots, X_3) \quad X_4 \bar{X}_5 \bar{X}_6 \bar{X}_7$$

.

.

.

$$v j_{15}(X_0, \ldots, X_3) \quad X_4 X_5 X_6 X_7$$
$$=f_1 \, v \, f_2 \, v \qquad v \, f_{15}$$

This final sequence may be logically extrapolated to the original function by merely reversing the mathematical steps in the logic implementation. If generalized logic matrices are employed as illustrated in FIG. 1 this implementation may be made with eight such matrices of 4 input variables and 16 columns each. The first matrix would generate the J functions and, thus, have the variables $X_0$ through $X_3$ as inputs. The second generalized matrix would generate the $X_4$ through $X_7$ functions. The subfunctions $f_1$ through $f_{16}$ may then be derived by merely ANDing the appropriate output columns from the two generalized matrices. These 16 subfunctions are then ORed together to derive the function $F$ of eight variables.

However, the expansion of the function may also be made by pairing the $N$ variables so that each generalized logic matrix would only employ two variables as inputs. Further employing the eight variable functions above to illustrate this point it may be expanded as follows: $f(X_0,...,X_7)=g_0 \cdot X_6 X_7 \, v \, g_1 X_6 X_7 \, v \, g_2 \cdot X_6 \cdot X_7 \, v \, g_3 X_6 X_7$ where $$g_0=h_0^0(X_0,X_1,X_2,X_3,) \cdot \bar{X}_4 \cdot \bar{X}_5 \, v \, h_0^1 \cdot \bar{X}_4 \cdot X_5 \, v \, h_{30} \cdot X_4 \cdot \bar{X}_5 \, v \, h_0^3 \cdot X_4 \cdot h_5$$
$$g_1=h_1^0(x_0,X_1,X_2,X_3,) \cdot \bar{X}_4 \cdot \bar{X}_5 \, v \, h_1^2 \cdot \bar{X}_4 \cdot X_5 \, V \, h_1^2 \cdot X_4 \cdot \bar{X}_5 \, V \, h_1^3 \cdot X_4 \cdot X_5$$
$$g_2=h_2^0 \cdot \bar{X}_4 \cdot \bar{X}_5 \, v \, h_2^1 \cdot \bar{X}_4 \cdot X_5 \, v \, h_2^2 \cdot X_4 \cdot \bar{X}_5 \, v \, h_2^3 \cdot X_4 \cdot X_5$$
$$g_3=h_3^0 \cdot \bar{X}_4 \cdot \bar{X}_5 \, v \, h_3^1 \cdot \bar{X}_4 \cdot X_5 \, v \, h_3^2 \cdot X_4 \cdot \bar{X}_5 \, v \, h_3^3 \cdot X_4 \cdot X_5$$

The $H$ terms similarly may be expanded in two functions of two variables. One such example should suffice:

$$h_0^0(X_0,X_1,X_2,X_3)=j_{00}^0(X_0,X_1) \cdot \bar{X}_2 \cdot \bar{X}_3$$
$$v j_{00}^1 \bar{X}_2 \cdot \bar{X}_3 v j_{00}^2 \cdot X_2 \cdot \bar{X}_3 v j_{00}^3 \cdot X_2 \cdot X_3$$

Thus, this expansion of the function $F(X_0,X_1,...,X_7)$ may be diagrammed as follows:

$$4\ g \text{ functions } f(X_0, \ldots, X_7)=g_0 \cdot \bar{X}_6 \cdot \bar{X}_7 v \ldots$$
$$4 \times 4=16h \text{ functions } h_0^0 \cdot \bar{X}_4 \cdot \bar{X}_5$$
$$v h_0^1 \cdot \bar{X}_4 \cdot X_5 v h_0^2 \cdot X_4 \cdot \bar{X}_5 v h_0^3 \cdot X_4 \cdot X_5$$
$$4 \times 4 \times 4=64J \text{ functions } j_{00}^0 \bar{X}_2 \bar{X}_3 v j_{00}^2 X_2 \bar{X}_3 v j_{00}^1 \bar{X}_2 X_3$$

Now it is evident that the function of 8 variables may also be implemented by four such generalized logic matrices with two inputs each as well as two logic matrices with four inputs each. The first of such logic matrices would generate the J functions with variables $X_0$ and $X_1$ as inputs. The second matrix would generate the $X_2$ and $X_3$ functions with these variables as inputs. The column outputs of these matrices would then be ANDed together and the appropriate columns, in turn, ORed together to produce the $h$ functions. The third logic matrix too would generate the $x_4$ and $X_5$ functions with these variables as inputs. The column outputs from this third matrix are then ANDed together with the already produced $h$ functions. The appropriate outputs from the AND gates are then ORed together to produce the $g$ functions. The fourth generalized matrix generates the desired $X_6$ and $X_7$ functions with these variables as inputs. The column outputs from this fourth matrix are then ANDed together with the $G$ functions. The outputs from these AND gates are then ORed together to produce the desired function $F$ of eight variables.

Figure 2:
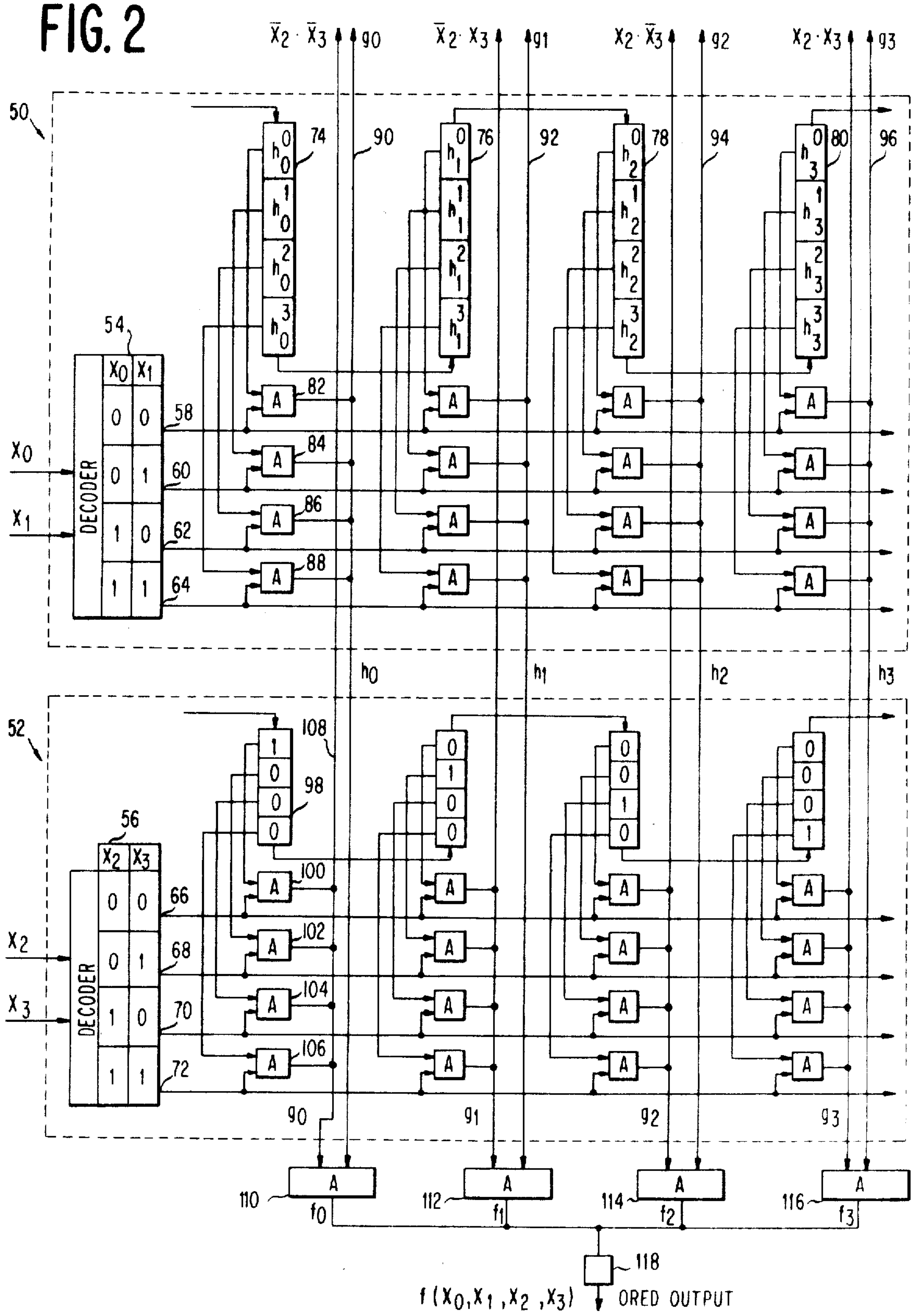
FIG. 2 illustrates the partitioning technique of the invention.

FIG. 2 illustrates a configuration for implementing a four variable function by employing the above described techniques. The configuration comprises two generalized logic matrices 50 and 52 whose operation is identical to the generalized logic matrix described in FIG. 1 except that each matrix accepts only two input variables rather than three. Because there are only two inputs to each decoder 54 and 56, there are only four output lines 58—64 and 66—72 from each decoder respectively, rather than eight output lines as in the three variable input decoder as shown in FIG. 1.

Before describing the operation of the matrix as shown in FIG. 2, it may be beneficial to expand the function $F$ of four variables $F(X_0X_1X_2X_3)$ according to the above description wherein the variables are paired. Therefore:

$$F(X_0X_1X_2X_3)=g_0\cdot\bar{X}_2\cdot\bar{X}_3 \vee g_1\cdot\bar{X}_2\cdot X_3 \vee g_2\cdot X_2\cdot\bar{X}_3 \vee g_3\cdot X_2\cdot X_3$$

where $$g_0=h_0^{0}\cdot\bar{X}_0\cdot\bar{X}_1 \vee h_0^{1}\cdot\bar{X}_0\cdot X_1 \vee h_0^{2}\cdot X_0\cdot\bar{X}_1 \vee h_0^{3}\cdot X_0\cdot X_1$$
$$g_1=h_1^{0}\cdot\bar{X}_0\cdot\bar{X}_1 \vee h_1^{1}\cdot\bar{X}_0\cdot X_1 \vee h_1^{2}\cdot X_0\cdot\bar{X}_1 \vee h_1^{3}\cdot X_0\cdot X_1$$
$$g_2=h_2^{0}\cdot\bar{X}_0\cdot\bar{X}_1 \vee h_2^{1}\cdot\bar{X}_0\cdot X_1 \vee h_2^{2}\cdot X_0\cdot\bar{X}_1 \vee h_2^{3}\cdot X_0\cdot X_1$$
$$g_3=h_3^{0}\cdot\bar{X}_0\cdot\bar{X}_1 \vee h_3^{1}\cdot\bar{X}_0\cdot X_1 \vee h_3^{2}\cdot X_0\cdot\bar{X}_1 \vee h_3^{3}\cdot X_0\cdot X_1$$

Thus, a desired function of four variables may be implemented from the following four subfunctions:

$$f_0=g_0\cdot\bar{X}_2\cdot\bar{X}_3$$
$$f_1=g_1\cdot\bar{X}_2\cdot X_3$$
$$f_2=g_2\cdot X_2\cdot\bar{X}_3$$
$$f_3=g_3\cdot X_2\cdot X_3$$

Turning now more specifically to FIG. 2, it may be seen how these subfunctions are generated. The matrix 50 generates the $g$ functions from the input variables $X_0$ and $X_1$. These variables are inputs to the decoder 54 which provides an output at one of its output lines 58—64 depending upon the values of these inputs. For example, if both $X_0$ and $X_1$ are zero's a positive signal would appear on output line 58 and similarly if $X_0$ were zero and $X_1$ were 1 an output would appear on line 60. The $h$ values necessary to produce the desired $g$ function are stored in the storage registers 74 through 80. Hence, if the desired $g_0$ function were $\bar{X}_0\bar{X}_1$, $h_0$ would be one and the remaining $h_0$ values would be zero, therefore, a value of one would be stored in the first bit of storage register 74 and zeros in the remaining bits. In operation, this would mean that in the first column of the matrix 50 only the AND gate 82 would have a positive input from the storage register 74. Therefore, a positive column output would appear on the interconnection line 90 only when a positive signal appeared on the output line 58 from the decoder that is, only when $X_0$ and $X_1$ were both zero. Hence, the desired function $g_0=\bar{X}_0\bar{X}_1$ appears as the column output of interconnection line 90. Similarly, if the desired $g_0$ function were equal to $\bar{X}_0X_1 \vee X_0\bar{X}_1$, the values of $h_0^1$ and $h_0^2$ would be ones and the remaining $h_0$ values would be zero. Thus, the second and third bits in storage register 74 would be positive and the remaining bits would be negative. The AND gates 84 and 86 would produce a positive column output on interconnection line 90 whenever either $X_0$ or $X_1$ were one but not both. The remaining columns in matrix 50 operate similarly and produce the functions $g_1, g_2$, and $g_3$ as column outputs on the interconnection lines 92 through 96, respectively.

The matrix 52 generates the second terms in the functions $f_0 f_1 f_2$ and $f_3$, that is, the $\bar{X}_2\bar{X}_3, \bar{X}_2X_3, X_2\bar{X}_3$, and $X_2X_3$ functions. It is desired that the $\bar{X}_2\bar{X}_3$ function be generated in the first column of the matrix 52 so it may be easily combined with the $g_0$ function produced in the first column of matrix 50. To produce the function $\bar{X}_2\bar{X}_3$, a one is stored in the first bit of storage register 98 and zeros in the remaining bits. A positive value stored in the first bit of storage register 98 means that one input to the AND gate 100 is always present, and zeros stored in the remaining bits of storage register 98 means that the input conditions of AND gates 102 through 106 may never be satisfied even with a change of input variables $X_2X_3$. Therefore, a positive column output will appear on the interconnection line 108 only whenever a positive signal appears on the output line 66 from the decoder, and this will occur in turn only whenever the input variables $X_2X_3$ are both negative. The remaining columns of matrix 52 operate in a similar fashion to generate the functions $\bar{X}_2X_3$, $X_2\bar{X}_3$, and $X_2X_3$.

Thus, the functions $g_0, g_1, g_2$, and $g_3$ have been generated in the matrix 50 and the functions $\bar{X}_2\bar{X}_3$, $\bar{X}_2X_3$, $X_2\bar{X}_3$ and $X_2X_3$ have been generated in the matrix 52. The appropriate column outputs from these matrices are then ANDed together by the AND gates 110—116 to generate the functions $f_0, f_1, f_2$, and $f_3$. These individual functions are then ORed together in OR gate 118 to produce a desired function of four variables $f(X_0, aX_1, X_2, X_3)$.

Further improvement in the above described partitioning technique is possible by treating each subset of variables independently. The functions of the subset variables may then be logically combined into the desired composite function of all variables with a reduced number of logic gates and no loss of generality. For example, the function of four variables described above would take the form as follows if the subsets of paired variables were treated independently:

$$f(X_0,X_1,X_2,X_3)=[g_0(X_0X_1)h_0(X_2,X_3)]v$$
$$[g_2(X_0,X_1)h_2(X_2,X_3)]v$$
$$[g_3(X_0,X_1)h_3(X_2,X_3)]$$

The number of columns required in the matrix system depends upon the number of terms on the right-hand side of the above equation since each term requires one column for its generation. This reduction in the number of columns is dependent upon two features. The first is that of the possible logic functions available from $N$ variables, there are some which are redundant. Secondly by treating the variables independently, they may be rearranged so that rather than $x_0$ and $X_1$ being decoded in the first matrix and the variables $X_2$ and $X_3$ decoded in a second matrix the variables $X_1$ and $X_2$ may, for example, be decoded in the first matrix and the variables $X_0$ and $X_3$ decoded in the second matrix.

To illustrate the redundancy feature of logic functions consider the following function of four variables which has been arranged in a table according to its disjunctive normal form. Since it is a four variable function, there are sixteen possible combinations of input variables. Thus, there are 16 rows illustrated in the table, each row is associated with one combination of the four input variables. The fifth column represents the disjunctive normal coefficients of these possible combinations.

| $X_0$ | $X_1$ | $X_2$ | $X_3$ | |
|---|---|---|---|---|
| 0 | 0 | 0 | 0 | 1 |
| 0 | 0 | 0 | 1 | 0 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 1 |
| 1 | 0 | 1 | 1 | 0 |
| 1 | 1 | 0 | 0 | 1 |
| 1 | 1 | 0 | 1 | 0 |
| 1 | 1 | 1 | 0 | 1 |
| 1 | 1 | 1 | 1 | 1 |

Hence the function represented by the above table is $$F=\bar{X}_0\cdot\bar{X}_1\cdot\bar{X}_2\cdot\bar{X}_3 \vee$$
$$\bar{X}_0\cdot\bar{X}_1\cdot X_2\cdot\bar{X}_3 \vee$$
$$\bar{X}_0\cdot\bar{X}_1\cdot X_2\cdot X_3 \vee$$
$$\bar{X}_0\cdot X_1\cdot\bar{X}_2\cdot\bar{X}_3 \vee$$
$$\bar{X}_0\cdot X_1\cdot\bar{X}_2\cdot X_3 \vee$$
$$X_0\cdot X_1\cdot\bar{X}_2\cdot\bar{X}_3 \vee$$
$$X_0\cdot\bar{X}_1\cdot X_2\cdot\bar{X}_3 \vee$$
$$\bar{X}_0\cdot X_1\cdot X_2\cdot X_3 \vee$$
$$X_0\cdot X_1\cdot X_2\cdot\bar{X}_3 \vee$$
$$X_0\cdot X_1\cdot X_2\cdot X_3$$

Assuming that the above function is to be implemented by a partitioned matrix system as disclosed in FIG. 2 where the variables $X_0$ and $X_1$ are inputs to the decoder 54 and the variables $X_2$ and $X_3$ are inputs to the decoder 56, the subfunctions would be implemented as follows:

$$F=(\bar{X}_0\bar{X}_1 \vee \bar{X}_0X_1 \vee X_0X_1)\cdot(\bar{X}_2\bar{X}_3) \vee$$
$$(\quad \bar{X}_0X_1)\cdot(\bar{X}_2X_3) \vee$$
$$(\bar{X}_0\bar{X}_1 \vee X_0\bar{X}_1 \vee X_0X_1)\cdot(X_2\bar{X}_3) \vee$$
$$(\bar{X}_0\bar{X}_1 \vee \bar{X}_0X_1 \vee X_0X_1)\ (X_2X_3)$$
$$=g_0(\bar{X}_2\bar{X}_3) \vee g_1(\bar{X}_2X_3) \vee g_2(X_2\bar{X}_3) \vee g_3(X_2X_3)$$

where the first term is generated in the first column of matrix 50, that is function $g_0$, the second term is generated in the first column of matrix 52, the third term is generated in the second column of matrix 50, that is function $g_1$, and the fourth term is generated in the second column of matrix 52, and so on. It should be noted however that the first and seventh term of the above equation are equal, that is, $g_0=g_3$. Once this is recognized the equation may be implemented with only three columns since the first and last columns may be combined because the function may be rewritten in only three terms as follows:

$$F=g_0(\bar{X}_2\bar{X}_3 \vee \bar{X}_2X_3 \vee X_2X_3) \vee g_1(\bar{X}_2X_3) \vee g_2(X_2\bar{X}_3)$$

As rewritten, the first two terms may be generated in only one column of logic by storing an additional one value in the fourth cell of register 98 so that the function generated from the column output line 108 is $\bar{X}_2\bar{X}_3+X_2X_3$. Thus, to generate this particular function the matrix system as illustrated in FIG. 2 may be reduced by one column to a matrix comprising only three columns. This reduction is possible solely because of the redundancy in the above function.

Such redundancies may be easily recognized by the following procedure. The table described above can be transformed into a chart wherein the possible combinations of the $X_0$ and $X_1$ variables are placed at the left and the possible combinations of the $X_2$ and $X_3$ variables are placed at the top and the coefficients of these combinations are placed in the center of the chart. Such a chart illustrating the above table is as follows:

| | | $X_2X_3$ | | | |
|---|---|---|---|---|---|
| | | 00 | 01 | 10 | 11 |
| $X_0X_1$ | 00 | 1 | 0 | 1 | 1 |
| | 01 | 1 | 1 | 0 | 1 |
| | 10 | 0 | 0 | 1 | 0 |
| | 11 | 1 | 0 | 1 | 1 |

By employing this chart redundancies may be easily detected whenever one column is identical to another column or one row is identical to another row. In the above chart the first column is identical to the fourth column and thus there is a redundancy. This redundancy may be eliminated as described above and the function may accordingly be generated with only three columns in each matrix rather than four.

A second reason that treating the variables independently may lead to reduction in the required number of columns is that the variables may then be interchanged with one another. For example, the variable $X_0$ need not be paired with the variable $X_1$ and may also be paired with either one of the variables $X_2$ or $X_3$. The advantage that such a flexibility might yield can be illustrated by the function represented in the following chart:

| | | $X_2X_3$ | | | |
|---|---|---|---|---|---|
| | | 00 | 01 | 10 | 11 |
| $X_0X_1$ | 00 | 1 | 0 | 0 | 0 |
| | 01 | 0 | 1 | 0 | 0 |
| | 10 | 0 | 0 | 1 | 0 |
| | 11 | 0 | 0 | 0 | 1 |

As the variables are paired in the above chart, and hence in a matrix system as illustrated in FIG. 2, four columns are required since there is no redundancy in any row or column. However, if the variables may be paired differently, that is $X_0$ with $X_2$ and $X_1$ with $X_3$, as in the following chart it may be seen that the columns containing one values may be reduced to two:

| | | $X_1X_3$ | | | |
|---|---|---|---|---|---|
| | | 00 | 01 | 10 | 11 |
| $X_0X_2$ | 00 | 1 | 0 | 0 | 1 |
| | 01 | 0 | 0 | 0 | 0 |
| | 10 | 0 | 0 | 0 | 0 |
| | 11 | 1 | 0 | 0 | 1 |

It should be noted that the functions in both the above charts are identical only the pairing of the variables has been changed. It should also be noted that there is a redundancy in the chart immediately above and therefore the number of columns may be further reduced to only one. Hence, by treating the variables independently a reduction of four columns to only one column has been achieved.

Figure 3:
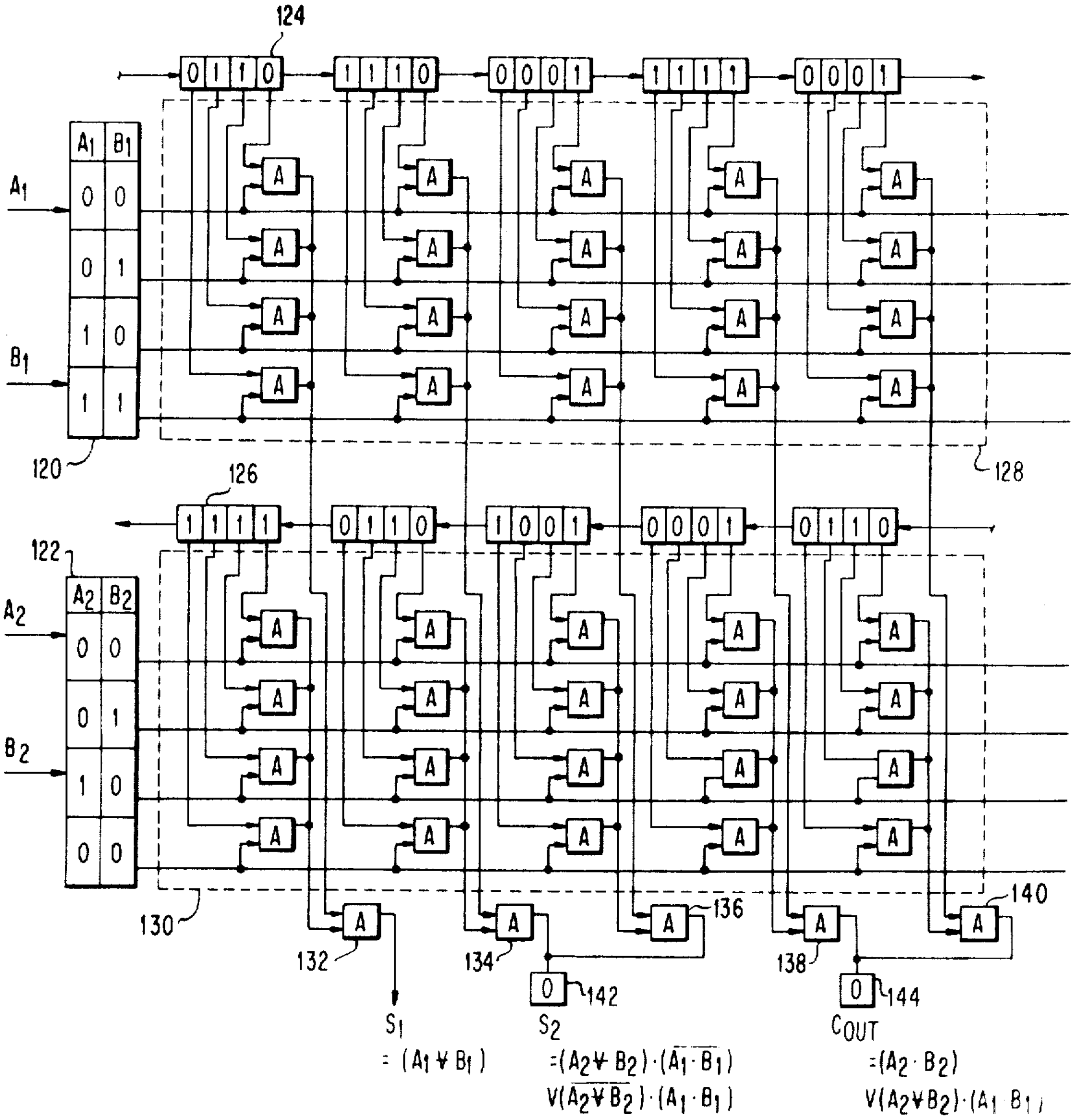
FIG. 3 illustrates the partitioning technique of the invention wherein the variables are treated independently.

FIG. 3 illustrates the improvement provided by treating the variables independently. It illustrates a two bit binary adder whose inputs are the addend bits $A_2$, $A_1$ and the augend bits $B_2$,$B$ where the subscript 2 represents the high order bit position. The two output sums $S_2$,$S_1$ and the output carry $C_{out}$ are formed with only five columns of logic gates. Its overall operation is similar to the partitioned matrices as illustrated in FIG. 2. As in FIG. 2, the four variables are independently decoded as pairs of variables in the decoders 120 and 122. Shift registers 124 and 126 are provided for each composite matrix 128 and 130. Each composite matrix comprises AND gates arranged in columns and rows with four AND gates in each column. Therefore, there are four cells in each storage register associated with each column. The column output functions as generated in each matrix are ANDed together in the AND gates 132—140. The OR gates 142—144 OR the outputs from the AND gates 134—136 and 138—140 respectively.

The binary sum of the low order bit is 1 whenever one of the low order bit inputs are 1, that is, whenever $A_1$ or $B_1$ is 1 but not when both are 1. This is merely the exclusive OR of these functions. By employing the above described techniques this function may be produced in one column; however, only if the variables are paired as shown, that is, $A_1$ with $B_1$ and $A_2$ with $B_2$. This can be shown by first pairing the variables in a different fashion, for example, as shown in the chart below:

| | | $B_1B_2$ | | | |
|---|---|---|---|---|---|
| | | 00 | 01 | 10 | 11 |
| $A_1A_2$ | 00 | 0 | 0 | 1 | 1 |
| | 01 | 0 | 0 | 1 | 1 |
| | 10 | 1 | 1 | 0 | 0 |
| | 11 | 1 | 1 | 0 | 0 |

Without taking into consideration the redundancy occuring in the first and second columns and again in the third and fourth columns, four columns would be required to implement this exclusive OR function. If the redundancy is taken into account it may be implemented in two columns by factoring as below:

$$F=(A_1\bar{A}_2 \vee A_1A_2)(\bar{B}_1\bar{B}_2 \vee \bar{B}_1B_2) \vee$$
$$(\bar{A}_1\bar{A}_2 \vee \bar{A}_1A_2)(B_1\bar{B}_2 \vee B_1B_2)$$

where the first and second terms may be generated in the first column and the second and third terms may be generated in the second column. However, if the variables are paired differently as shown in the chart below the exclusive OR function may be generated in one column:

| | | $A_2B_2$ | | | |
|---|---|---|---|---|---|
| | | 00 | 01 | 10 | 11 |
| $A_1B_1$ | 00 | 0 | 0 | 0 | 0 |
| | 01 | 1 | 1 | 1 | 1 |
| | 10 | 1 | 1 | 1 | 1 |
| | 11 | 0 | 0 | 0 | 0 |

The exclusive OR function may now be implemented in one column as shown by the following equation:

$$F=(\bar{A}_1B_1 \vee A_1\bar{B}_1)(\bar{A}_2\bar{B}_2 \vee \bar{A}_2B_2 \vee A_2\bar{B}_2 \vee A_2B_2)$$

This is in fact the implementation as shown in the first column of FIG. 3. The first term in the equation is generated by the first column in the matrix 128 with $A_1$ and $B_1$ as input variables and the second term is generated by the first column in the matrix 130 with $A_2$ and $B_2$ as input variables. This is achieved by storing a 1 in the second and third cell of the storage register 124 and storing all ones in the storage register 126.

The required number of columns needed to generate the second bit binary sum $S_2$ and the output binary carry $C_{out}$ have similarly been reduced from four each to two each.

While the invention has been particularly shown and described with reference to a preferred embodiment thereof, it will be understood by those skilled in the art that various changes in form and details may be made therein without departing from the spirit and scope of the invention.

We claim:

1. A method of partitioning the logic operations in a plurality of generalized logic matrices for implementing a set of logic functions $F_1$—$F_k$ of N variables, said N variables used as inputs to said generalized logic matrices, and each of said generalized logic matrices comprising a plurality of logic gates arranged in a dense topology and each gate having at least two input terminals and at least one output terminal, a storage register for storing a predetermined input signal for each of said logic gates, an input decoder accepting a predetermined number of said N variables as inputs and generating at least one independent output signal for each possible combination of said predetermined input variables, inputs to said logic gates comprising said signals stored in said storage register and said output signals of said decoder, and interconnection means for tying together all of said outputs from said logic gates in each column, whereby a logic function dependent upon said stored signals and said output of said decoder is generated at the output of said interconnection means for each column as a column output in each of said generalized logic matrices, said method comprising:

a. independently decoding U variables in a first generalized matrix where U is a number less than N;
b. storing appropriate signals in said register of a first generalized matrix so that said column outputs of said first generalized matrix comprise desired functions of said U input variables;
c. independently decoding V variables in a second generalized matrix where the number V is less than N;
d. storing appropriate signals in said register of second generalized matrix so that the column outputs of said second generalized matrix comprise desired functions of said V input variables;
e. logically combining the column outputs of said first and second generalized matrices to generate desired functions of U+V variables;
f. independently decoding X variables in a third generalized matrix where X is a number less than N;
g. storing appropriate signals in said register of said third generalized matrix so that said column outputs comprise desired functions of said X input variables;
h. logically combining said generated functions of U+V variables with said column output from said third generalized matrix to generate desired functions of U+V+X variables;
i. repeating the above procedures until the desired function F of N variables is generated.

2. The method of claim 1 characterized in that U, V and X and other groups are substantially equal.

3. The method of partitioning logic operations in a plurality of generalized logic matrices for implementing a logic function F of N variables, said N variables used as inputs to said generalized logic matrices, and each of said generalized matrices comprising a plurality of logic gates arranged in columns and rows and each gate having two input terminals and one output terminal, a variable storage register for storing a predetermined input signal for each of said logic gates, an input decoder accepting a predetermined number of said n variables as inputs and generating an independent output signal for each possible combination of said predetermined input variables, inputs to said logic gates comprising said signals stored in said variable storage register and said output signals in said decoder, an interconnection means for tying together all of said outputs from said logic gates in each column, whereby the logic function dependent upon said stored signals and said output of said decoder is generated at the output of said interconnection means for each column as a column output in each of said generalized logic matrices, said method comprising:

a. independently decoding U variables in a first generalized matrix where U is a number less than N;
b. storing appropriate signals in said register of a first generalized matrix so that said column outputs of said first generalized matrix comprise desired functions of said U input variables;
c. independently decoding V variables in a second generalized matrix where the number V is less than N;
d. storing appropriate signals in said register of second generalized matrix so that the column outputs of said second generalized matrix comprise desired functions of said V input variables:
e. repeating the above procedures to further generalize matrices until the number of decoded variables equals N;
f. logically combining the column outputs from said generalized logic matrices to generate the desired function F of N variables.

4. A partitioned logic system for implementing a logic function F of N variables having the plurality of generalized logic matrices, said N variables used as inputs to said generalized logic matrices, and each of said generalized logic matrices comprising a plurality of logic gates arranged in columns and rows and each gate having two input terminals and one output terminal, a variable storage register for storing a predetermined input signal for each of said logic gates, and input decoder accepting a predetermined number of said N variables as inputs and generating an independent output signal for each possible combination of said predetermined input variables, said inputs to said logic gates comprising said signals stored in said variable storage register and said output signals of said decoder, and said interconnection means for tying together all of said outputs from said logic gates in each column, whereby a logic function dependent upon said stored signals and said output of said decoder is generated at the output of said interconnection means for each column each of said generalized logic matrices, said system comprising:

a. means for independently decoding U variables in a first generalized matrix where U is a number less than N;
b. means for storing appropriate signals in said register of a first generalized matrix so that each column outputs of said first generalized matrix comprise desired functions of said U input variables;
c. means for independently decoding V variables in a second generalized matrix where the number V is less then N and U+V equal N;
d. means for storing appropriate signals in said register of the second generalized matrix so that the column outputs of said second generalized matrix comprise desired functions of said V input variables;
e. means for logically combining the column outputs of said first and second generalized matrices to generate desired functions of N variables.